United States Patent
Yi et al.

(10) Patent No.: US 11,248,276 B2
(45) Date of Patent: Feb. 15, 2022

(54) HOT STAMPED COMPONENT, PRECOATED STEEL SHEET USED FOR HOT STAMPING AND HOT STAMPING PROCESS

(71) Applicant: IRONOVATION MATERIALS TECHNOLOGY CO., LTD., Jiangsu (CN)

(72) Inventors: Hongliang Yi, Liaoning (CN); Zhiyuan Chang, Liaoning (CN); Zhaoyuan Liu, Liaoning (CN); Dapeng Yang, Liaoning (CN); Xiaochuan Xiong, Jiangsu (CN)

(73) Assignee: Ironovation Materials Technology Co., Ltd., Jiangsu (CN)

( * ) Notice: Subject to any disclaimer, the term of this patent is extended or adjusted under 35 U.S.C. 154(b) by 0 days.

(21) Appl. No.: 16/611,880

(22) PCT Filed: Dec. 27, 2018

(86) PCT No.: PCT/CN2018/124145
§ 371 (c)(1),
(2) Date: Nov. 8, 2019

(87) PCT Pub. No.: WO2019/205698
PCT Pub. Date: Oct. 31, 2019

(65) Prior Publication Data
US 2020/0385836 A1  Dec. 10, 2020

(30) Foreign Application Priority Data

Apr. 28, 2018 (CN) .......................... 201810401259.5

(51) Int. Cl.
*C21D 9/46* (2006.01)
*B21D 22/02* (2006.01)
(Continued)

(52) U.S. Cl.
CPC ............. *C21D 9/46* (2013.01); *B21D 22/022* (2013.01); *B32B 15/012* (2013.01); *C21D 1/34* (2013.01);
(Continued)

(58) Field of Classification Search
CPC . C21D 9/46; C21D 1/34; C21D 6/002; C21D 6/005; C21D 6/008; B21D 22/022;
(Continued)

(56) References Cited

U.S. PATENT DOCUMENTS 6,815,087 B2   11/2004  Takagi et al.
8,066,829 B2 * 11/2011  Spehner .................. C22C 38/38
                                              148/534

(Continued)

FOREIGN PATENT DOCUMENTS

CN      1472068 A     2/2004
CN    101583486 A    11/2009
(Continued)

OTHER PUBLICATIONS

Gui et al., "Enhancing ductility of the Al—Si coating on hot stamping steel by controlling the Fe—Al phase transformation during austenitization", Science China Technological Sciences, Sep. 2014, vol. 57, No. 9, pp. 1785-1793.
(Continued)

*Primary Examiner* — Anthony J Zimmer
*Assistant Examiner* — Ricardo D Morales
(74) *Attorney, Agent, or Firm* — Morgan, Lewis & Bockius LLP (57) ABSTRACT

The present invention relates to a hot stamped component, a precoated steel sheet used for hot stamping, and a hot stamping process. The hot stamped component of the present invention is provided with a coating of aluminium or an aluminium alloy on at least one surface of the base steel, the
(Continued)

Precoating thickness: 5μm    Precoating thickness: 14μm    Precoating thickness: 25μm coating is produced by interdiffusion between the base steel and a precoating of aluminium or aluminium alloy, and the coating has a thickness of 6 to 26 μm.

6 Claims, 5 Drawing Sheets

(51) Int. Cl.
| | |
|---|---|
| *B32B 15/01* | (2006.01) |
| *C21D 1/34* | (2006.01) |
| *C21D 6/00* | (2006.01) |
| *C22C 38/02* | (2006.01) |
| *C22C 38/04* | (2006.01) |
| *C22C 38/06* | (2006.01) |
| *C22C 38/28* | (2006.01) |
| *C22C 38/32* | (2006.01) |

(52) U.S. Cl.
CPC .............. *C21D 6/002* (2013.01); *C21D 6/005* (2013.01); *C21D 6/008* (2013.01); *C22C 38/02* (2013.01); *C22C 38/04* (2013.01); *C22C 38/06* (2013.01); *C22C 38/28* (2013.01); *C22C 38/32* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
CPC ....... B32B 15/012; C22C 38/02; C22C 38/04; C22C 38/06; C22C 38/28; C22C 38/32
See application file for complete search history.

(56) References Cited

U.S. PATENT DOCUMENTS

| | | | |
|---|---|---|---|
| 8,307,680 B2 | 11/2012 | Drillet et al. | |
| 8,440,323 B2 * | 5/2013 | Spehner .................. | C23C 2/12 428/653 |
| 9,644,252 B2 | 5/2017 | Maki et al. | |
| 10,131,117 B2 | 11/2018 | Thirion et al. | |
| 10,232,426 B2 | 3/2019 | Maki et al. | |
| 2011/0300407 A1 | 12/2011 | Cho et al. | |
| 2015/0079420 A1 | 3/2015 | Hanlon et al. | |
| 2016/0318093 A1 | 11/2016 | Maki et al. | |
| 2016/0362764 A1 | 12/2016 | Sohn et al. | |
| 2018/0142337 A1 * | 5/2018 | Kim .......................... | B21B 1/38 |
| 2018/0216218 A1 | 8/2018 | Amorim et al. | |
| 2019/0185959 A1 | 6/2019 | Sanadres et al. | |
| 2019/0309385 A1 | 10/2019 | Yi et al. | |

FOREIGN PATENT DOCUMENTS

| | | |
|---|---|---|
| CN | 101910426 A | 12/2010 |
| CN | 102300707 A | 12/2011 |
| CN | 105658822 A | 6/2016 |
| CN | 105829578 A | 8/2016 |
| CN | 106164184 A | 11/2016 |
| CN | 106282912 A | 1/2017 |
| CN | 106399837 A | 2/2017 |
| CN | 106466697 A | 3/2017 |
| CN | 107614733 A | 1/2018 |
| CN | 107815612 A | 3/2018 |
| EP | 2377965 A2 | 10/2011 |
| EP | 2851440 A1 | 3/2015 |
| GN | 102348824 A | 2/2012 |
| GN | 103492605 A | 1/2014 |
| JP | 2003-041343 A | 2/2003 |
| JP | 2003-049256 A | 2/2003 |
| JP | 2007-270258 A | 10/2007 |
| JP | 2007-314874 A | 12/2007 |
| JP | 2010-018860 A | 1/2010 |
| JP | 2015-227494 A | 12/2015 |
| JP | 2017-535666 A | 11/2017 |
| KR | 20160139091 A | 12/2016 |
| KR | 10-2018-0022929 A | 3/2018 |
| WO | 2009/090443 A1 | 7/2009 |
| WO | 2011/104443 A1 | 9/2011 |
| WO | 2015/098653 A1 | 2/2015 |
| WO | 2015/039763 A2 | 3/2015 |

OTHER PUBLICATIONS

Supplementary European Search Report issued in EP18915788.6 dated Nov. 13, 2020.
Japanese Office Action dated Jun. 9, 2020 in JP2019-563098.
Fan et al., "Formation of an Aluminide Coating on Hot Stamped Steel", ISIJ International, vol. 50 (2010), No. 11, pp. 1713-1718.
Suehiro et al., "Properties of Aluminum-coated Steels for Hot-forming", Nippon Steel Technical Report No. 88, Jul. 2003, pp. 16-21.
Windmann et al., "Formation of intermetallic phases in Al-coated hot-stamped 22MnB5 sheets in terms of coating thickness and Si content", Surface & Coatings Technology 246 (2014) pp. 17-25.
Aldén, "Metallurgical investigation in weldability of Aluminium Silicon coated boron steel with different coating thickness", Royal Institute of Technology (KTH), Dept. of Materials Science and Engineering, Dissertation (2015).
StandardSpecification for Steel Sheet, Aluminum-Coated, by the Hot-Dip Process, ASTM International, Designation A463/A463M-10, pp. 1-6.
"Heat Treatment Technology", Labor and Personnel Press, Feb. 1989, pp. 216-220 (with partial translation).
Invalidation Request and supplementary observations filed in corresponding Chinese Patent Application No. 2018104012595, issued Dec. 27, 2019.
International Search Report (with partial translation) issued in corresponding International Patent Application No. PCT/CN2018/124145, dated Mar. 22, 2019.
Office Action dated May 8, 2019 (OA1) issued in corresponding Chinese Patent Application No. 201810401259.5.
Office Action dated Jun. 12, 2019 (OA2) issued in corresponding Chinese Patent Application No. 201810401259.5.
Office Action dated Jul. 15, 2019 (OA3) issued in corresponding Chinese Patent Application No. 201810401259.5.
Notification to Grant a Patent Right for Invention dated Aug. 19, 2019 issued in corresponding Chinese Patent Application No. 201810401259.5.
Hu et al., "Heat Treatment of Steels (Principles and Technology) 5th Edition", pp. 32-36, Northwest Polytechnic University Press, Aug. 2016.
"Heat Treatment Technology", Department of Training, Ministry of Labor, pp. 216-218, Labor Personnel Press, Feb. 1989.
Office Action issued in corresponding Korean Patent Application No. 10-2019-7032979, dated Jan. 29, 2020.

* cited by examiner

Total dwell time in the furnace including heating (min.)

Fig.10

HOT STAMPED COMPONENT, PRECOATED STEEL SHEET USED FOR HOT STAMPING AND HOT STAMPING PROCESS

TECHNICAL FIELD

The present invention relates to a hot stamped component, a precoated steel sheet for hot stamping, and a hot stamping process.

BACKGROUND ART

In recent years, due to the urgent need for energy conservation, environmental protection and improvement of vehicle safety, automobile lightweighting and safety have become the focus of attention and work for the automotive industry. Ultra-high-strength steel can achieve weight reduction due to its excellent strength properties, thereby achieving the goal of lightweighting. However, the manufacturing of high-strength steel parts is difficult to achieve by conventional cold stamping. In this case, hot stamping technology came into being.

In the hot stamping process, when the bare sheet is formed by stamping, it is heated under a protective atmosphere such as nitrogen or argon to avoid oxide scale and decarburization, but oxidation is unavoidable during transfer and forming The oxide scale will affect the state of the contact interface between the sheet material and the die, which not only reduces the contact heat transfer coefficient between the die and the sheet material, but also increases the friction coefficient between the steel sheet and the die. When stamping, the detached oxide scale will wear the surface of the die, affecting the forming quality of the part and the life of the die. More importantly, the oxide layer needs to be removed before entering the automobile assembly and painting. Therefore, the hot stamped component of the bare sheet must be shot-peened or pickled to remove the oxide layer and the automobile is then assembled and painted. This not only greatly increases the cost of hot stamping, but also the shot peening causes the deformation due to the release of the residual stress of the part, resulting in a decrease in the assembly accuracy of the automobile; the pickling treatment causes serious environmental problems and increases the risk of hydrogen induced embrittlement of the component. At the same time, automotive parts are generally required to have a certain degree of corrosion resistance. Therefore, the development of coated steel sheets for hot stamping has become an urgent need for the development of hot stamping technology. At present, the coatings developed globally mainly include coatings of pure zinc (GI), alloyed zinc iron (GA), hot dip galvanized aluminium silicon (Zn—Al—Si) and aluminium silicon (Al—Si) and the like. Among them, for the hot stamping steel, high temperature resistant aluminium-silicon coating is widely used. The Al—Si coating can effectively avoid oxidation and decarburization of the steel sheet surface, omitting the shot peening and sand blasting process, and the corrosion resistance is also improved. The coating was first proposed by ArcelorMittal and successfully applied to industrial steel sheets. The typical alloy composition (mass percentage) is: 87% Al-10% Si-3% Fe.

In order to meet increasingly stringent automotive lightweight and crash safety requirements, hot stamping steels of higher grade have been developed. However, as the strength of the material increases, its plasticity and toughness decrease accordingly. One of the most typical methods for detecting plasticity and toughness of materials is the static three-point bending test (VDA-238 standard). How to improve the bending angle (maximum bending angle) of the material under the maximum load state, is the emphasis and difficulty of research.

For hot stamping steel, it is known that the bare sheet has a certain decarburization layer on its surface after hot stamping, so its maximum bending angle is higher than that of the aluminium-silicon coated sheet of the same base material and of the same specification. That is to say, the maximum fracture strain of the bare sheet after the hot stamping is relatively high (compared with aluminium-silicon coated sheet), thereby improving the resistance to the localised cracking failure of the part during a crash event. However, considering the entire industrial chain, aluminium-silicon coated sheets are more conducive to the production and manufacture of automotive body parts. Therefore, it is particularly important to study the coating process and forming process of the steel sheet to improve the maximum fracture strain after hot stamping of the aluminium-silicon coated sheet while developing a higher-grade hot stamping steel.

CN101583486B (hereinafter referred to as Patent Document 1) provides a hot stamping coated steel sheet product and a method of preparing the same.

Figure 9:
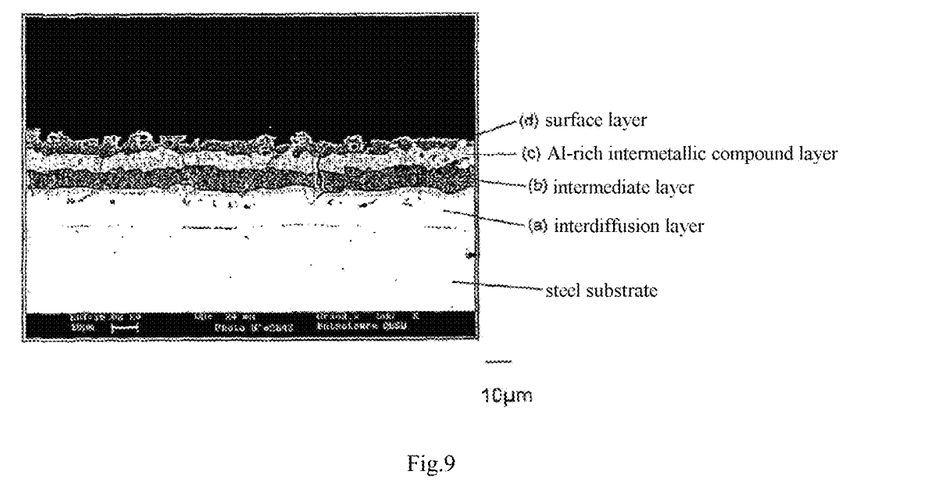
FIG. 9 is a view showing a structure of a coating after hot stamping of a steel sheet in prior art.

The hot stamping coated steel sheet used in Patent Document 1 has a precoating thickness of 20 to 33 µm, and a precoating having a thickness of 25 µm is generally used in the industry. After hot stamping, the component is covered with a coating of 30-40 µm. As shown in FIG. 9, the coating has a 4-layer structure, and the microstructure from the outermost layer to the substrate is: continuously distributed surface layer containing Al oxide and brittle $Fe_2Al_5$ phase (thickness: about 7 µm, hardness value HV10gf: 900 to 1000, average composition: 39 to 47% Fe, 53 to 61% Al, 0 to 2% Si), intermetallic compound FeAl layer (thickness: about 8 µm, hardness value HV10gf: 580 to 650, average composition: 62 to 67% Fe, 30 to 34% Al, 2 to 6% Si), intermediate layer containing brittle $Fe_2Al_5$ phase (thickness: about 8 µm, hardness value HV10gf: 900 to 1000, average composition: 39 to 47% Fe, 53 to 61% Al, 0 to 2% Si), an interdiffusion layer ($\alpha$-Fe phase that is rich in Al or Si) or an intermetallic compound FeAl layer (thickness: about 17 µm, hardness value HV10gf: 295 to 407, average composition: 86 to 95% Fe, 4 to 10% Al, 0 to 5% Si).

Patent Document 1 describes that when the thickness of the precoating is less than 20 µm, the formed alloying layer has insufficient roughness, so that in the subsequent painting process the paint adhesion on the surface is low. However, the inventors of the present application found that the surface roughness of the alloying layer is not determined by the thickness and structure of the alloying layer, and that a large surface roughness is caused as long as the precoating is liquefied during heating. On the other hand, the allegation in Patent Document 1 that the paint adhesion on the surface requires a large roughness is because the outermost layer after alloying described in Patent Document 1 is an intermetallic compound of $Fe_2Al_5$ on which the paint is not easily adhered, hence a large roughness is required. In contrast, if the structure of the outermost coating changes and is no longer $Fe_2Al_5$, the need for painting no is longer has to require the surface roughness considered in Patent Document 1.

On the other hand, when the thickness of the precoating is more than 33 µm, the thickness difference of the precoating between different regions of the surface of steel sheet blank may be excessively large, and the coating alloying is uneven when the blank is heated. This is mainly because certain local precoating thickness exceeds the average precoating thickness, so the element diffusion distance or degree between the substrate and the metal precoating is significantly lower than the average value, resulting in insufficient alloying between metals and even melting of the precoating, so that scale forms on rollers of furnace, which is most likely to occur at higher heating rates.

Figure 10:
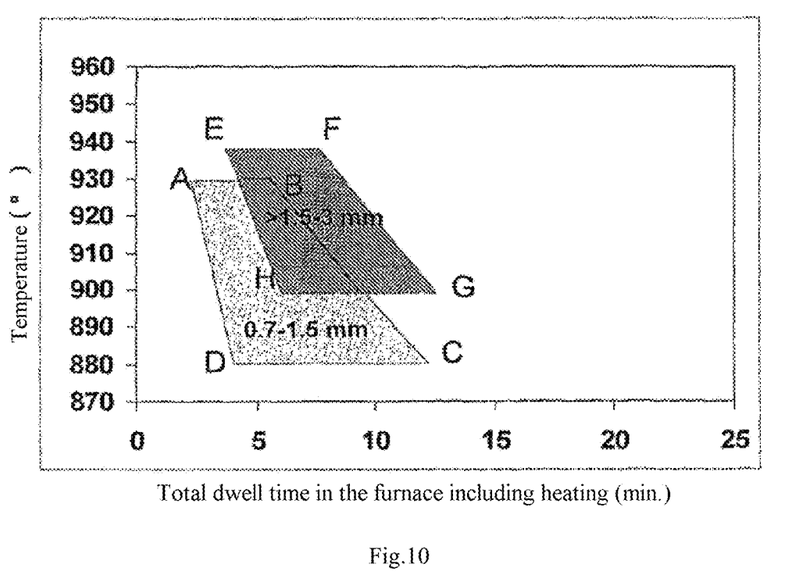
FIG. 10 is a view showing a hot stamping process in prior art.

Further, in the hot stamping process of Patent Document 1, as shown in FIG. 10, the coated steel having a thickness of 0.7 mm to 1.5 mm is heated in the range of 880 to 930° C., and the heating time is controlled between 2.5 min and 12 min, preferably at 930° C. for 3 min to 6 min, and at 880° C. for 4 min to 13 min. For coated steel having a thickness of 1.5 mm to 3 mm, heating is carried out in the range of 900 to 940° C., and the heating time is controlled between 4.5 min and 13 min, preferably at 940° C. for 4 min to 8 min, and at 900° C. for 6.5 min to 13 min, wherein the heating rate between 200 and 700° C. is 4 to 12° C./s, and after being stamped by a die, it is cooled at a cooling rate of at least 30° C./s.

However, the technique of Patent Document 1 has the following problems.

First, it has been found in the actual production process that the hot stamping coated steel sheet of Patent Document 1 has a problem that the cold bending performance (the bending toughness according to VDA-238 standard) is low after hot stamping.

Cold bending performance is a property of characterizing a metal material's capability to bear bending load without breaking at room temperature, is and can well reflect the plastic deformation capability of the bended location of the test piece. Its deformation mode is similar to the failure mode of an automobile component during a crash event. Therefore, for hot stamping steel sheet, its cold bending performance is extremely important. Generally, the crash safety of automotive materials is evaluated by examining the three-point bending angle of the material under the maximum bending load, which reflects the magnitude of the fracture failure strain under plane strain condition. The three-point bending test, according to test standard VDA238-100 issued by Verband der Automobilindustrie (VDA), showed that the maximum bending angle of a formed component obtained on a hot stamping steel having a 25 µm precoating is generally 35 to 55°, which is lower than the lower limit of some auto manufacturers' requirements, bringing about the risk of premature cracking in bending condition. In a crash event, car components are required to have good energy absorbing capability, especially for side impact, so insufficient energy absorption induced by premature cracking is not allowed.

Further, the hot stamping coated steel sheet of Patent Document 1, after hot stamping, also has a problem of worsening the welding electrode and accelerating the wear of the stamping die. For example, when the average thickness of the precoating described in Patent Document 1 is about 25 µm, after hot stamping, the surface layer of the coated steel sheet is mainly brittle $Fe_2Al_5$ phase having a thickness of 7 µm or more, and the average hardness value thereof is as high as 850 to 1000 HV10gf. The high hardness of the surface layer will accelerate the wear of the stamping die. When the steel sheet is welded, the life of the welding electrode will be deteriorated, which is only about ¼ of that of the non-coated sheet.

Secondly, the relatively large precoating thickness on the hot stamping coated steel sheet in Patent Document 1 leads to low hot-dip coating is production efficiency, high alloy cost, and low heating efficiency during hot stamping.

Specifically, the precoating of Patent Document 1 has a thickness of 20 to 33 µm, and is preferably 25 µm in actual industrial production. When the hot-dipping temperature is constant, the thickness of the precoating increases as the hot-dipping time increases and this relationship follows the parabolic law. Therefore, the thicker the precoating is, the longer the hot-dipping time is required, the lower the efficiency is, and the higher the production cost is. In addition, from the alloy cost perspective, the thicker the precoating is, the higher the amount of alloy consumed, and the higher the alloy cost is. Furthermore, the precoating itself has heat reflectivity, and during hot stamping the thicker the precoating is, the lower the heating efficiency is.

Again, the hot stamping process of Patent Document 1 has a problem that heating efficiency is low.

Specifically, the method mainly uses a conventional heating device to heat the precoated steel sheet. In a conventional heating furnace, heating is performed mainly by heat radiation and heat convection, and Patent Document 1 sets the furnace temperature and the heating time according to the thickness of the steel sheet and the austenization temperature. Usually, after heating to a temperature, 50 to 100° C. higher than the equilibrium austenization temperature, that is, 880 to 940° C., it is necessary to keep it for a further period of time in order to ensure complete austenization, uniformity of grain size and element distribution. However, according to the classical heat conduction formula $\phi=KA\varDelta T$ (where $\phi$: heat flux, K: total thermal conductivity, A: heat transfer area, $\varDelta T$: temperature difference), it is known that the greater the temperature difference, the higher the heat transfer efficiency, in the case where the thermal conductivity and the heat transfer area are constant. For the heating process of Patent is Document 1, since the furnace set temperature is only higher than the equilibrium austenization temperature by 50 to 100°, when the surface temperature of the steel sheet approaches or reaches the set temperature of the furnace, the internal temperature of the steel sheet does not certainly reach the set furnace temperature. In addition, since the temperature difference is too small, the heat transfer efficiency is greatly reduced, and it is necessary to hold the steel sheet for a longer time in order to achieve a complete austenitization. However, if the holding time is too long, it may cause abnormal growth of some grains.

Further, as in Patent Document 1 the precoating has a large thickness 20 to 33 µm, this patent not only defines the heating rate in the first heating stage, that is, the heating rate in the stage of 200 to 700° C. is 4 to 12° C./s, and also defines a longer holding time. In addition to satisfy the austenization of the substrate, the purpose thereof is more to make the precoating fully alloyed to form a 4-layer alloying layer, so as to avoid the problem of scale formation of the furnace rollers due to insufficient alloying between the substrate and the metal precoating, while ensuring the welding requirements.

In fact, in actual production, when hot stamping is carried out according to the method provided in Patent Document 1, it is found that a thick precoating and a single fixed heating process are prone to problems of insufficient alloying, which ultimately leads to scale formation on the furnace rollers. In this instance, the manufacturer for hot stamped component has to periodically replace the furnace rollers. In terms of costs, due to the expensive price of the furnace roller, the production costs are greatly increased; in terms of quality, the quality of the product is degraded, resulting in an increase in the ratio of defective products, which also brings an increase in production costs.

SUMMARY OF THE INVENTION

The present invention has been made in view of the above problems in the prior art, and an object thereof is to provide a hot stamped component having improved VDA bending toughness.

Another object of the present invention is to provide a motor vehicle including the above-described hot stamped component.

Another object of the present invention is to provide a precoated steel sheet which can improve the VDA bending toughness after hot stamping.

It is still another object of the present invention to provide a hot stamping process capable of obtaining a hot stamped component having improved VDA bending toughness.

There are many factors affecting the cold bending performance test results. Except for the direction of the cold bending sample (the longitudinal direction is parallel to the rolling direction and the transverse direction is perpendicular to the rolling direction) that has an important influence on the cold bending performance test results, the cold bending test speed, the span between the support rollers, the width of the test piece, and the diameter of the bend center all have different effects on the cold bending performance test results. However, these factors are all specified in the technical inspection standards and are also to be followed. For example, the VDA238-100 standard issued by VDA specifies the size and span of the cold bending sample. Therefore, it is important to analyze and discuss other factors that influence the results of the cold bending test (surface coating, decarburization layer, and structure of sample etc.).

In a conventional precoated steel sheet having a 25 μm precoating, during hot stamping heating and austenization process, Fe atoms in the substrate diffuse toward the precoating and Al in the precoating diffuses into the substrate, and the boundary of the substrate/coating will move toward the substrate side. After intensive research, the inventors found that as the boundary between the substrate and the coating moves, C atoms in the substrate will diffuse; and since is the solubility of C atoms in the substrate (it is an austenite with high saturated solubility of C when heated) is extremely high, and the solubility of C atoms in the coating (aluminium-containing ferrite and/or iron-aluminium compound) is extremely low, the C atom can hardly diffuse toward the coating side, and must be accumulated near the boundary between the substrate and the coating (on the substrate side), forming a distinct C-rich zone. After hot stamping and cooling, the C-rich zone will form a martensite structure with a high C content, which is very brittle, so that when the steel sheet is bent, the cracking failure occurs first in the C-rich brittle martensite region, so that VDA bending toughness is reduced. Therefore, the inventors have realized that the breakthrough in solving the VDA performance weakness in the prior art is to reduce the degree of C enrichment by improving the coating or the relationship between the coating and the substrate, and further reduce the brittleness of the martensite in the region.

Based on this finding, a first aspect of the present invention provides a hot stamped component, wherein the hot stamped component is provided with a coating of aluminium or an aluminium alloy on at least one surface of the base steel, the coating is produced by interdiffusion between the base steel and a precoating of aluminium or aluminium alloy, and the coating has a thickness of 6 to 26 μm.

According to the present invention, the thickness of the coating is reduced compared to the prior art. Therefore, the formed component of the present invention can be prepared by using a precoated steel sheet having a relatively thin precoating. Specifically, the thickness of the precoating can be reduced to 3 to 19 μm, preferably 5 to 18 μm, and more preferably 12 to 18 μm. The total content of Al element in the thinner precoating is relatively small, so that the total amount of interdiffusion of Fe and Al becomes small, which makes the movement of the boundary of the substrate/coating toward the substrate side is small. Accordingly, the degree of accumulation of C atoms near the boundary between the substrate and the coating (on the substrate side) is smaller, and the degree of segregation of C atoms thereof is significantly reduced as compared with the precoating having a thickness of 20 μm or more. When the three-point bending (VDA238-100 standard) test is performed, compared with the conventional formed component with a coating thickness of 30 μm or more (corresponding to a precoating thickness of the precoated steel sheet of 20 μm or more), the fracture failure strain of the formed component according to the present invention is greatly improved, and the maximum bending angle is increased by 1 to 7°. For example, in the component with 21 μm coating thickness (corresponding to the precoating thickness of 14 μm) of the steel sheet of the present invention, the maximum bending angle according to the VDA standard is 4° higher than in the currently applied component with 34 μm coating thickness (corresponding to the precoating thickness of 25 μm) in the prior art, in this way the impact toughness of the hot stamped component can be greatly improved.

Further, Patent Document 1 mentions that when the thickness of the precoating is less than 20 μm, the corrosion resistance is lowered. However, in fact, the precoating is alloyed during hot stamping, and the innermost layer after alloying (layer a in Patent Document 1) is a structure of BCC iron in which a large amount of Al (and Si) is solid dissolved; the alloying layers at the outer side are intermetallic compounds of Fe and Al (layer b, c, and d in Patent Document 1), and the hardness is as high as 650 to 1000 HV, so that all alloying layers are liable to form a large number of microcracks during hot stamping, which penetrate through the intermetallic compound layer on the surface in the depth direction. A few years after the publication of Patent Document 1, this problem was discovered in the hot stamping industry and the automotive industry worldwide. Such microcracks will cause a decrease in corrosion resistance. That is to say, the viewpoint in Patent Document 1, that the corrosion resistance is improved by ensuring that both the precoating thickness of the precoated steel sheet and the coating thickness of the formed component are thick, is not tenable. The inventors of the present application considered that the corrosion resistance of the coated hot stamped component is independent of the intermetallic compound of the alloying layer, and is only related to the layer a thereof Therefore, the present invention only controls the formation of the layer a, and whether layers b, c, and d exist or not, and how they exist, do not affect the corrosion resistance of the coated components. That is, although the present invention thins the coating thickness of the formed component, it does not lower the corrosion resistance thereof.

Preferably, the coating is composed only of a first layer located on a side close to the base steel, that is, an innermost layer, and the first layer is an interdiffusion layer having a thickness of 6 to 14 μm. The composition of the interdiffusion layer is α-Fe containing Al and Si, wherein the Fe content is 70% by weight or more.

In this case, the coating structure contains only the interdiffusion layer. The thickness of the interdiffusion layer is greater than 6 μm to ensure formation of a certain transition layer so as to prevent the crack from expanding toward the substrate; the thickness is less than 14 μm so as to avoid excessively high total thickness of the alloying layer, which will result in excessive C diffusion and thereby cause C enrichment.

In addition, the interdiffusion layer is α-Fe rich in Al and Si, that is, Fe having a crystal structure of body centered cubic (BCC), wherein the Fe content is 70% by weight or more. The above said first layer may contain an intermetallic compound phase of 20% or less by volume, such as $Fe_3Al$ or the is like. In the first layer, it is also possible to cover the outer side of the intermediate layer with a FeAl layer having a thickness of 1 to 2 μm. The hardness value HV10gf of the first layer is 220 to 410.

In the case where the coating structure contains only the intermediate layer, the outer side of the interdiffusion layer is covered with an oxide of Al to ensure that the α-Fe of the layer is not oxidized.

As another preferred embodiment, the coating is composed of the first layer and a second layer, wherein the second layer is located outside the first layer, and the second layer has a thickness of 0-8 μm. The structure of the second layer is an intermetallic compound of Fe, Al, and Si, wherein the Fe content is 30% to 47.9% by weight.

In this case, the second layer is contained on the outer side of the first layer, and the second layer contains continuous brittle intermetallic compound phases such as $Fe_2Al_5$ and $FeAl_3$, and the hardness value HV10gf is 800 to 960.

As a further preferred embodiment, the coating is composed of the first layer, the second layer and a third layer, wherein the third layer is located outside the second layer, and the thickness of the third layer is 0 to 10 μm, the structure of the third layer is an intermetallic compound of Fe, Al and Si, wherein the Fe content is 48% to 69% by weight.

In this case, the third layer is contained on the outer side of the second layer, and the third layer is a phase of FeAl or $FeAl_2$, and may also contain less than 10% by weight of Si, and the hardness value HV10gf is 400 to 630.

As a further preferred embodiment, the coating is composed of the first layer, the second layer, the third layer, and a discontinuously distributed surface layer, wherein the surface layer is located outside the third layer. The surface layer has a thickness of 0 to 4 μm, and the surface layer comprises the is second layer structure and the third layer structure, and the surface layer contains at least 30% of the third layer structure by volume.

In this case, the discontinuously distributed surface layer is present on the outer side of the third layer, and the content of the second layer structure (intermetallic compound phase such as $Fe_2Al_5$, $FeAl_3$, etc.) in the surface layer is less than 70%, and the hardness value is The HV10gf is 650 to 850.

That is, the formed component of the present invention has a surface layer after hot stamping, but it is discontinuously distributed, and the hardness is lowered as compared with a conventional coating structure having a continuously distributed surface layer. The main reason is that the conventional coating surface layer contains $Fe_2Al_5$ more than 90%, while the $Fe_2Al_5$ phase has a high hardness, wherein the hardness value is of about 900 to 1000 HV10gf. In contrast, in the product of the present invention, $Fe_2Al_5$ in the outermost discontinuous surface layer is less than 70% by volume, and the thickness is only 0-4 μm, that is, there is a FeAl phase having a volume percentage of at least 30% (Fe content is 48% to 69% by weight), preferably containing no $Fe_2Al_5$. Furthermore, the FeAl phase has a low hardness (hardness of about 400 to 630 HV10gf) and a large volume percentage, and therefore, the surface hardness of the coating structure of the present invention is lowered.

It should be noted that as the coating is thinned, its microstructure evolves and the surface hardness of the coating evolves as well. For example, in the case where the coating is composed of the first layer, the second layer, the third layer, and the discontinuously distributed surface layer, the surface hardness is lowered to 650 to 850 HV10gf. In the case where the coating is composed of the first layer, the second layer and the third layer, the surface hardness is lowered to 400 to 630 HV10gf. For another example, in the case where the coating is composed only of the first layer, the surface hardness is lowered to 220 to 410 is HV10gf.

As described above, the surface hardness of the hot stamped component of the present invention decreases as the thickness of the coating is reduced, which not only reduces the wear of the stamping die, but also contributes to extending the life of the welding electrode.

A second aspect of the present invention provides a motor vehicle comprising the hot stamped component according to the first aspect.

For example, the hot stamped component can be used as a safety structural component, a reinforcing structural component, a wheel component, a high-strength and high-toughness automotive structural component or a chassis structural component of a land vehicle.

A third aspect of the present invention provides a pre-coated steel sheet for hot stamping, wherein a precoating of aluminium or aluminium alloy is provided on at least one surface of the base steel, wherein the total thickness of the precoated steel sheet for hot stamping is 0.5 mm to 3.0 mm, and the thickness of the precoating is 3 to 19 μm, preferably 5 to 18 μm, and more preferably 12 to 18 μm.

According to the present invention, the thickness of the precoating is thinned compared to the conventional precoated steel sheet, and thus can be used to form the hot stamped component of the first aspect. As described above, the use of the precoated steel sheet of the present invention can improve the VDA bending toughness after hot stamping, and at the same time, can reduce the hardness of the surface layer, thereby reducing the wear of the stamping die, and is advantageous for extending the life of the welding electrode.

In addition, since the thickness of the precoating is thin, the coating cost can be reduced, while helping to achieve rapid heating of the steel sheet.

As a preferred embodiment, the base steel comprises, by weight percentage, the following components: 0.28-0.4% of C; 0.6-3.5% of Mn; 0-0.004% of B; 0-0.4% of Nb+Ti+V, 0.05 to 1% Si, 0.01 to 1% Al; total content of less than 5% of Cr, Mo, Ni, Cu; and unavoidable impurity elements.

In this case, the produced hot stamped component has a tensile strength of ≥1700 MPa. Thereby, good mechanical properties can be obtained while improving the VDA bending toughness and reducing the surface hardness.

As a further preferred embodiment, the base steel comprises, by weight percentage, the following components: 0.19 to 0.29% of C; 0.6 to 3.5% of Mn; 0 to 0.004% of B; 0 to 0.4% of Nb+Ti+V; 0 to 2% of Si, 0 to 2% of Al; total content of less than 5% of Cr, Mo, Ni, Cu; and unavoidable impurity elements.

In this case, the obtained hot stamped component has a tensile strength of 1400 MPa to 1800 MPa.

More preferably, the base steel contains 0.1 to 0.4% of V by weight.

In this case, according to the condition for solid solubility product of VC precipitation, the austenite grain boundary may have a certain amount of complex carbides of VC and/or (V, Ti)C and/or (V, Ti, Nb)C in the austenization process. The second phase particles effectively pin the austenite grains, which will refine the prior austenite grains. Therefore, the precipitation of VC has an important influence on controlling the prior austenite grain size. More importantly, the precipitation temperature is coupled with the hot stamping process. According to a preferred embodiment of the present invention, it comprises the following components by the weight percentage: 0.35% C; 1.35% Mn; 0.002% B; 0.04% Ti; 0.2% V; 0.2% Si, 0.05% Al; 0.2% Cr, the prior austenite grain size obtained by hot stamping of the steel according to the present invention is 2.2-7 μm, and the grain refinement not only improves the strength but also improves the toughness. Further, in austenite grains, complex carbides of VC and/or (V, Ti)C and/or (V, Ti, Nb)C having a particle size of 0.1 to 20 nm can be obtained; the strength of the material can be further improved through precipitation strengthening of nano carbides. After hot stamping and paint baking and tempering, the strength of the component reaches 1950 MPa and the elongation is 8%.

A fourth aspect of the present invention provides a hot stamping process comprising the steps of: a steel sheet austenization step, multi-stage heating the precoated steel sheet for hot stamping according to the third aspect or a preformed component thereof to 840° C. or more; steel sheet transfer step, transferring the heated precoated steel sheet to the hot stamping die, wherein it is to ensured that the temperature of the precoated steel sheet is 550° C. or more when transferred to the die; hot stamping step, stamping the transferred precoated steel sheet in the die to obtain a hot stamped component.

As described above, the present invention innovatively proposes a multi-stage rapid heating solution for the precoated steel sheet according to the third aspect. Firstly, the thickness of the precoating is reduced, the total heat transfer efficiency is improved, and it is easier to quickly achieve austenitization of the steel sheet. Secondly, segmental temperature control is adopted, the temperature difference is large, the heating efficiency is greatly improved, and rapid heating is realized. The process can improve the production efficiency while avoiding the abnormal growth of austenite grains due to long-term soaking in the high temperature section. Moreover, the thinner precoating and the multi-stage heating arrangement make the alloying between the substrate and the metal coating more complete, thereby avoiding a series of problems such as welding and scaling of the furnace roller. It has been proved that not only the service life of the furnace roller is effectively improved, but also the qualification rate of the product is improved, and the production costs are greatly saved. The multi-stage heating can be achieved by setting a roller hearth furnace or is providing an induction heating device.

Moreover, the VDA maximum bending angle of the finished product sheet after hot stamping can be remarkably increased by using a precoated steel sheet having a precoating thickness reduction, and the toughness thereof can be improved as well. At the same time, it can effectively reduce the wear of stamping die, prolong the life of welding electrode, and improve the anti-collision safety and energy absorption effect of automobile body parts to a large extent, further promote the development of automotive materials, and is more conducive to energy saving and emission reduction.

Further, more importantly, the rapid heating causes the diffusion time of Fe and Al to be shortened, so that the movement of the boundary between the substrate and the coating toward the substrate side is further reduced. Correspondingly, the degree of accumulation of C atoms near the boundary between the substrate and the coating (on the substrate side) is smaller, which is more advantageous for the improvement of the VDA bending toughness.

Preferably, in the austenization step of the steel sheet, the multi-stage heating is performed in the following manner for a precoated steel sheet having a thickness of 0.5 to 1.5 mm, the heating temperature is set to 700-875° C. in the preheating stage for coating alloying, the heating temperature in the first stage of austenization heating is set to 920-940° C., the heating temperature in the second stage is set to 940-960° C., the heating temperature in the third stage is set to 920-940° C., the fourth stage is the soaking stage, and the temperature is set to 900 to 920° C. For the precoated steel sheet with a thickness of 0.5 to 1.0 mm, the total heating time (stages 1 to 4) is set to 90 s to 140 s; for the precoated steel sheet with a thickness greater than 1.0 mm and less than or equal to 1.5 mm, the total heating time is set to 120 s to 180 s; for the precoated steel sheet having a thickness greater than 1.5 mm and less than or equal to 3.0 mm, the heating temperature is set to 700 to 895° C. in the preheating stage for coating alloying, the heating temperature in the first stage of austenization is set to 940-960° C., the heating temperature in the second stage is set to 950-970° C., the heating temperature in the third stage is set to 940-960° C., the fourth stage is the soaking stage, and the temperature is set to 920 to 940° C., wherein for the precoated steel sheet with a thickness greater than 1.5 mm and less than or equal to 2.0 mm, the total heating time is set to 180 s-220 s; for the precoated steel sheet having a thickness greater than 2.0 mm and less than or equal to 2.5 mm, the total heating time is set to 180 s-260 s; for the precoated steel sheet having a thickness greater than 2.5 mm and less than or equal to 3.0 mm, the total heating time is set to 200 s-300 s.

The above process steps are matched with the precoated steel sheet of the present invention. The melting temperature of the precoated Al or alloy plating layer is about 600° C., so that the surface of the coating is liquefied at the beginning of the heating process, liquid Al or Al-alloy will react with the rollers of the roller hearth furnace and adhere to the rollers to affect the life of the rollers. In order to reduce the generation of liquid Al or Al-alloy, the present invention comprises a preheating stage for coating alloying, the purpose of which is to realize sufficient alloying between Al or Al-alloy in the precoating and Fe in the substrate so as to reduce the reaction between the liquid Al or Al alloy on the surface of the steel sheet and the furnace rollers.

The above process steps are matched with the precoated steel sheet of the present invention, wherein the coating structure required for the formed component of the first aspect can be obtained, the effects of increasing the VDA bending toughness and reducing the surface hardness etc. can be achieved, and the desired mechanical properties can be obtained.

Preferably, after the steel sheet transfer step, a paint baking step is is further comprised. In the paint baking step, the hot stamped component is heated to 130 to 200° C. and is held for 5 to 60 minutes and then is cooled in any way.

After the paint baking step, the mechanical properties of the hot stamped component are further improved. For example, after baking at 170° C./20 min, the yield strength of the hot stamped component is increased by 50 to 150 MPa, the tensile strength is lowered by about 50 to 120 MPa, the elongation is increased by about 0 to 3%, and the impact toughness value is increased by 5 to 20 J/cm$^2$, the collision energy absorption effect of the material is thus improved.

DETAILED DESCRIPTION OF THE PRESENT INVENTION

The present invention will be described in more detail below with reference to exemplary embodiments. The following embodiments or experimental data are intended to exemplify the present invention, and it should be apparent to those skilled in the art that the present invention is not limited to these embodiments or experimental data.

Firstly, the precoated steel sheet for hot stamping of the present invention has a thickness of 0.5 to 3.0 mm, wherein the precoating has a thickness of 3 to 19 μm, and in the present embodiment, the precoated steel sheet for hot stamping respectively having a precoating of a thickness of 5 μm and 14 μm is provided, wherein the precoating is formed on the upper and lower surfaces of the steel sheet. Further, a precoated steel sheet for hot stamping having a precoating of a thickness of 25 μm is provided for comparison.

Wherein, the base steel of the steel sheet comprises, by weight percentage, the following components: 0.28 to 0.4% C; 0.6 to 3.5% Mn; 0 to 0.004% B; 0 to 0.4% Nb+Ti+V, 0.05-1% Si, 0.01-1% Al; total content less than 5% Cr, Mo, Ni, Cu; and unavoidable impurity elements, wherein V content is preferred 0.1~0.4%. Alternatively, the base steel comprises, by weight percentage, the following components: 0.19 to 0.28% C; 0.6 to 3.5% Mn; 0 to 0.004% B; 0 to 0.4% Nb+Ti+V; 0 to 2% Si, 0 to 2% Al; total content of less than 5% of Cr, Mo, Ni, Cu; and unavoidable impurity elements.

For example, as a preferred embodiment, the base steel comprises, by weight percentage, the following components: 0.35% C; 1.35% Mn; 0.002% B; 0.04% Ti; 0.2% V; 0.2% Si, 0.05% Al; 0.2% Cr.

The precoating of the precoated steel sheet of the present invention can be formed, for example, by hot-dip coating, and the basic composition of a typical hot-dip coating solution usually includes (by weight): 8 to 11% Si, 2% to 4% Fe, and the balance is Al or an Al alloy and unavoidable impurities. However, the present invention is not limited to this composition, and various aluminium or aluminium alloy coatings may be employed. Among them, Si is mainly for suppressing the formation of intermetallic compounds. If the silicon content is low, the aluminium-rich intermetallic compound $Al_2Fe$ phase is easily formed within 2 minutes of the austenization process, which is easy to transform into $Fe_2Al_5$ phase in 2 to 6 minutes after austenitization; this layer is a brittle phase and thus is unfavorable to the hot stamping die and to the welding electrode. Therefore, Si content is generally controlled at 8-11%. The high temperature stability and oxidation resistance of the coating are mainly provided by Al, namely a thin and dense $Al_2O_3$ is used as a protective film. The aluminium content in the precoating formed in this way is usually equal to or more than 60%.

As an example, the base steel and the precoating have the compositions shown in Table 1.

TABLE 1

Chemical compositions of the base steel and the precoating of the precoated steel sheet according to the present invention

| | Chemical compositions (weight %) | | | | | | | |
|---|---|---|---|---|---|---|---|---|
| | C | Mn | Ti | Cr | B | Si | Al | Fe |
| Base steel (22MnB5) | 0.23 | 1.18 | 0.04 | 0.16 | 0.0025 | 0.22 | 0.034 | Bal. |
| Precoating ($AlSi_{10}Fe_3$) | — | — | — | — | — | 10 | Bal. | 3 |

Wherein Bal. represents the balance other than other elements.

Figure 1:
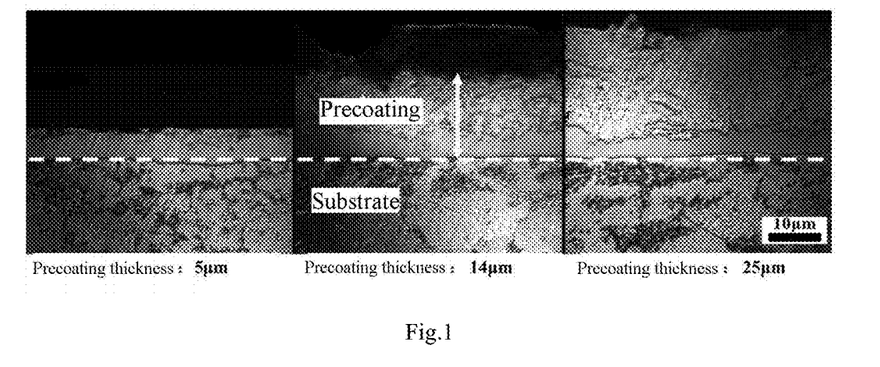
FIG. 1 is a view of a coating structure prior to hot stamping of a steel sheet having different precoating thicknesses.

The precoating structure of the 22MnB5 steel sheet is shown in FIG. 1. Wherein the left side steel sheet (the steel sheet of the present invention) has a precoating having a thickness of 5 μm, the middle steel sheet (the steel sheet of the present invention) has a precoating having a thickness of 14 μm, and the right is side steel sheet (conventional steel sheet) has a precoating having a thickness of 25 μm. The substrate for each steel sheet is ferrite and pearlite structure, and the precoating has the structure (from the substrate side) of an intermetallic compound layer ($Fe_2Al_5$, $Fe_2Al_8Si$), an aluminium coating.

The analysis on the precoating structures shows that the intermetallic compound layer thicknesses, of the steel sheets for hot stamping having different precoating thicknesses, are approximately equal, all are about 4.5 μm, and the difference lies mainly in the thicknesses of the aluminium coating. The thicknesses of the aluminium coating in the above respective steel sheets are 0.5 μm, 9.5 μm, and 20.5 μm, respectively.

For example, the steel sheet for hot stamping having a precoating of 3 to 19 μm according to the present invention can be produced by the following process.

(1) Steelmaking, according to the above chemical compositions, smelting by vacuum induction furnace, electric furnace or converter; using continuous casting technology to produce slab, or directly using thin slab continuous casting and rolling process.

(2) Uniform heating of the slab, heating the smelted slab to the temperature of 1150 to 1340° C. and keeping it at this temperature for 20 to 2000 minutes.

(3) Hot rolling, the slab is rough-rolled at 1020 to 1280° C., the total press quantity of the steel sheet is 50% or more, and the finishing temperature is controlled at 500° C. or higher to obtain a hot-rolled steel sheet; the hot-rolled product is coiled in a temperature zone below 840° C., and then pickling can be performed to obtain a hot-rolled pickled steel sheet. The final structure is pearlite+ferrite, or pearlite+ferrite+a small amount of bainite, or pearlite+ferrite+a small amount of martensite.

(4) The hot-rolled steel sheet described above may be subjected to cold rolling to obtain a cold-rolled steel strip.

(5) The surface of the cold-rolled steel sheet is subjected to different processes of coating the Al—Si precoating to obtain an Al—Si precoated steel sheet.

Next, the above said precoated steel sheet is subjected to hot stamping, and for example, the following hot stamping process can be employed.

Figure 7:
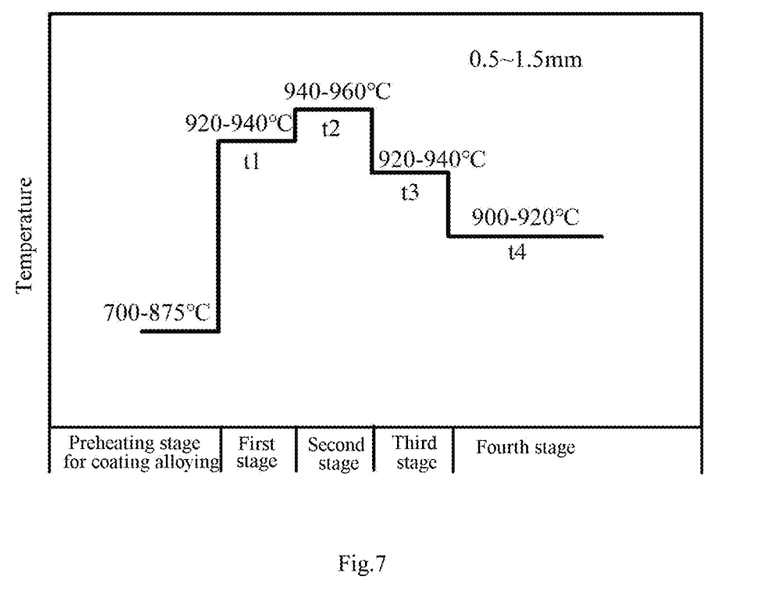
FIG. 7 is a view showing hot stamping process parameters of a sheet of 0.5 to 1.5 mm.
Figure 8:
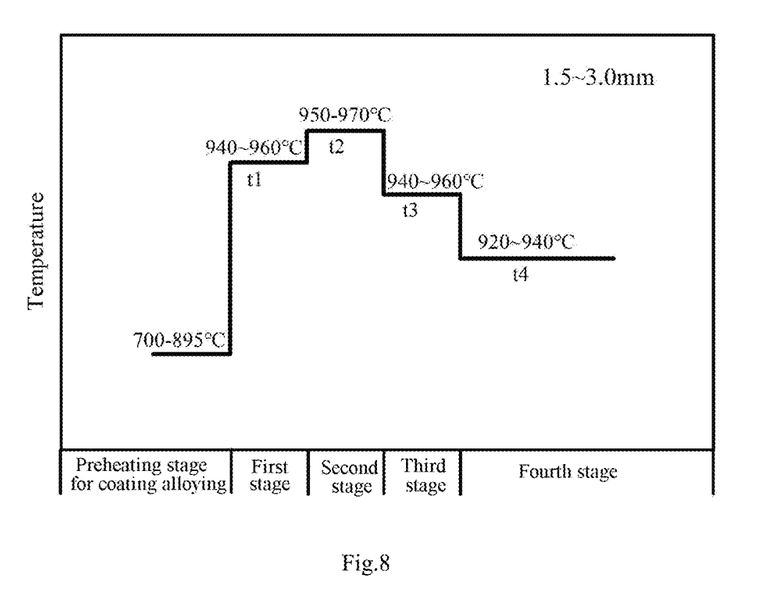
FIG. 8 is a view showing hot stamping process parameters of a sheet of 1.5 to 3.0 mm.

(a) steel sheet austenization: cutting the precoated steel sheet to obtain a steel sheet of predetermined size and shape; using heating devices such as a box furnace, roller hearth furnace or induction heating etc., heating procedure as shown in FIG. 7 and FIG. 8, the steel sheet for hot stamping or a preformed component thereof is rapidly heated to 700 to 970° C. and held for 0.5 to 15 minutes.

0.5 to 1.0 mm, the total heating time (stages 1 to 4) is set to 90 s-140 s, for the precoated steel sheet with thickness greater than 1.0 mm and less than or equal to 1.5 mm, the total heating time is set to 120 s-180 s; for the precoated steel sheet with thickness greater than 1.5 mm and less than or equal to 3.0 mm, the heating temperature is set to 700 to 895° C. in the preheating stage for coating alloying, in the austenization heating process, in the first stage the heating temperature is set to 940 to 960° C., in the second stage it is set to 950 to 970° C., and in the third stage it is set to 940 to 960° C., the fourth stage is a heat preservation stage, and the temperature is set to 920 to 940° C. For the precoated steel sheet having a thickness of more than 1.5 mm and less than or equal to 2.0 mm, the total heating time is set to 180 s to 220 s, and for the precoated steel sheet having a thickness of more than 2.0 mm and less than or equal to 2.5 mm, the total heating time is set to 180 s-260 s, for the precoated steel sheets with a thickness greater than 2.5 mm and less than or equal to 3.0 mm, the total heating time is set to 200 s to 300 s. In the case where the total heating time requirement is satisfied, the heating time in each stage can be distributed according to the thickness of the steel sheet or the like.

For example, the parameters in the austenization step of the steel sheet described above can be set as shown in Table 2.

TABLE 2

Hot stamping process parameters

| Sheet thickness | Preheating stage for coating alloying | 1st stage | 2nd stage | 3rd stage | 4th stage Heat preservation stage | total heating time 1st-4th stage |
|---|---|---|---|---|---|---|
| | | Quick heating stage | | | | |
| 1 mm | 875° C./60 s | 935° C./20 s | 950° C./20 s | 930° C./20 s | 910° C./80 s | 140 s |
| 1.5 mm | 875° C./90 s | 935° C./30 s | 960° C./30 s | 940° C./30 s | 920° C./90 s | 180 s |
| 2.0 mm | 895° C./120 s | 945° C./40 s | 970° C./40 s | 950° C./40 s | 930° C./100 s | 220 s |
| 2.5 mm | 895° C./150 s | 945° C./50 s | 970° C./50 s | 955° C./50 s | 930° C./110 s | 260 s |

(b) Steel sheet transfer: The heated steel sheet is transferred to a hot stamping die and it is ensured that the temperature of the steel sheet is 550° C. or higher when transferred to the die.

(c) Hot stamping: According to the size of the sheet, a reasonable press tonnage is set for stamping; and the holding time is determined according to the sheet thickness, and the die surface temperature can be controlled by the die cooling system so that the steel sheet in the die is cooled to 250° C. or less at an average cooling rate of not less than 10° C./s, and then cooled to room temperature in any manner to obtain a corresponding hot stamped component.

The formed component obtained by the above stamping can further be subjected to the following treatment:

(d) Paint baking: During the component paint baking process, the formed component is heated to 130 to 200° C., kept for 5 to 60 minutes, and then cooled in any manner.

In the austenization step of the steel sheet, for the precoated steel sheet having a thickness of 0.5 to 1.5 mm, the heating temperature is set to 700 to 875° C. in the preheating stage forcoating alloying, and it is heated to 840° C. or more in the austenization stage; specifically, the heating temperature in the first heating stage of austenization is set to 920 to 940° C., in the second stage it is set to 940 to 960° C., third stage it is set to 920 to 940° C., the fourth stage is a heat preservation stage, in which the temperature is set to 900 to 920° C. For the precoated steel sheet having a thickness of Then, the coating of the formed component obtained by the above process is analysed.

Table 3 illustrates variations in coating thickness before and after hot stamping of steel sheets having different precoating thicknesses, wherein IS1 and IS2 represent the precoated steel sheets of the present invention, and CS1 represents a conventional precoated steel sheet.

TABLE 3

Coating thickness before and after stamping of precoated steel sheets

| Sample | Base steel | Precoating | Precoating thickness (μm) | Coating thickness after hot stamping (μm) | Total thickness of the steel sheet (mm) |
|---|---|---|---|---|---|
| IS1 | 22MnB5 | AlSi$_{10}$Fe$_3$ | 5 | 10 | 1.2 |
| IS2 | 22MnB5 | AlSi$_{10}$Fe$_3$ | 14 | 21 | 1.2 |
| CS1 | 22MnB5 | AlSi$_{10}$Fe$_3$ | 25 | 34 | 1.2 |

Figure 2:
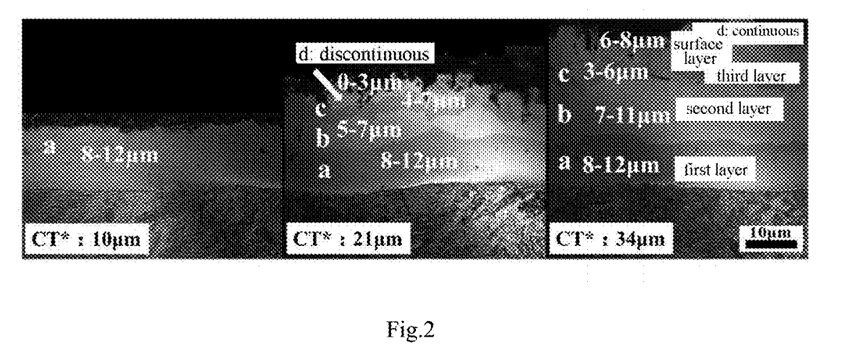
FIG. 2 is a view of a coating structure after hot stamping of a steel sheet having different precoating thicknesses.
Figure 3:
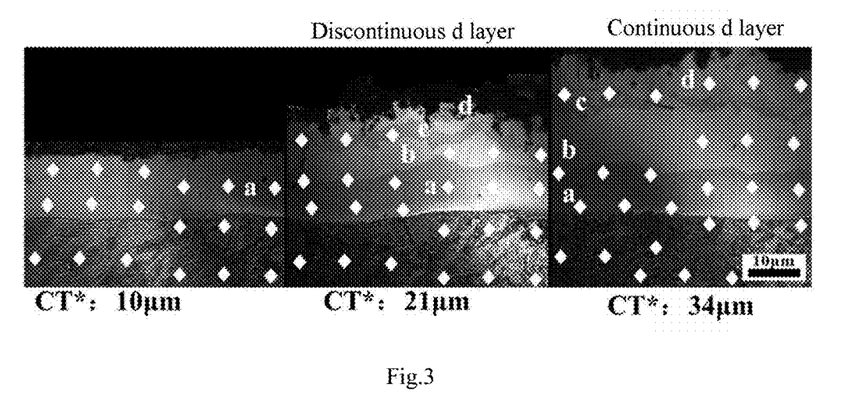
FIG. 3 is a schematic view showing the microhardness test position of a steel sheet having different precoating thicknesses after hot stamping.
Figure 4:
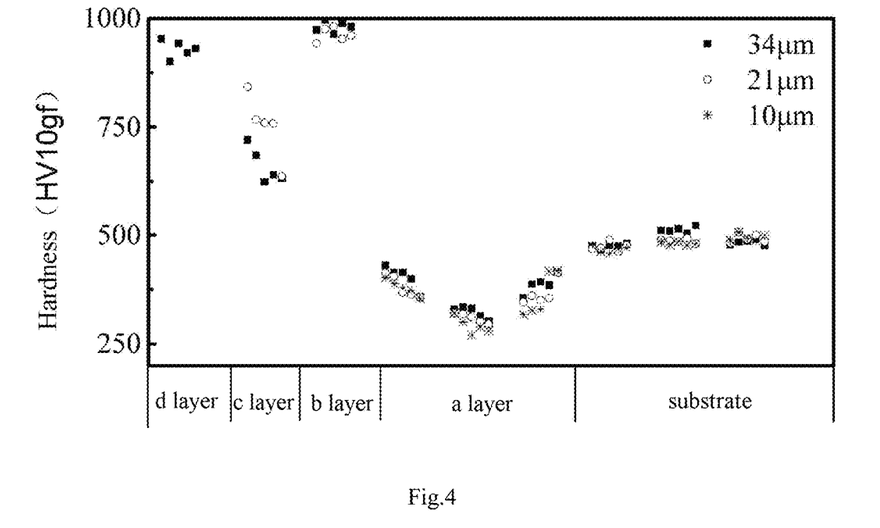
FIG. 4 is a microhardness trend diagram of a steel sheet having different precoating thicknesses after hot stamping.

In the above-mentioned precoated steel sheets for hot stamping having a precoating having a thickness of 5 μm, 14 μm, and 25 μm, respectively, after hot stamping, the coating thickness is changed to 10 μm, 21 μm, and 34 μm, respectively, and the coating structure is as shown in FIG. 2. The microhardness is measured for each layer, and the measurement position and results are shown in FIGS. 3 and 4.

Specifically, the following layers are sequentially arranged from the base to the outside:

(a) First layer: an interdiffusion layer having a thickness of 6 to 14 μm, and in the illustrated example, 8 to 12 μm. The thickness of the interdiffusion layer needs to be greater than or equal to 6 μm to ensure that a certain transition layer is formed to prevent crack propagation to the substrate; the thickness of 14 μm or less is mainly to avoid C enrichment due to excessive diffusion of C. The interdiffusion layer is α-Fe rich in Al and Si, wherein the Fe content is 70% by weight or more. Further, the interdiffusion layer may contain intermetallic is compound phases of Fe and Al, such as $Fe_3Al$ of nanoparticles. Further, the surface of the interdiffusion layer may further be covered by an intermetallic compound FeAl layer of 1 to 2 μm. The intermetallic compound, such as $Fe_3Al$ and FeAl accounts are equal to or less than 20% by volume in the first layer. The hardness value HV10gf of the first layer is 220 to 410.

When the thickness of the precoating is thin, the hardness of the surface layer is reduced greatly after the steel of the present invention is subjected to hot stamping. Specifically, when the coating is composed only of the first layer, the surface hardness is 220 to 410 HV10gf. Even in the case where the interdiffusion layer contains the $Fe_3Al$ phase, since the coating of the present invention is thin and the $Fe_3Al$ phase content is extremely small, the coating hardness is generally speaking not more than 410 HV10gf. In contrast, the surface layer after hot stamping of the conventional steel sheet is a continuously distributed $Fe_2Al_5$ phase, and the fracture toughness value of the $Fe_2Al_5$ phase itself is 1 MPa$\sqrt{m}$, and the hardness value is as high as 900 to 1150 HV10gf.

(b) Second layer: it is mainly intermetallic compound phase, such as continuous brittle $Fe_2Al_5$, $FeAl_3$, intermetallic compounds of Fe and Al containing Si. The thickness of the second layer is 0 to 8 μm, and is 5 to 7 μm in the illustrated example, wherein the Fe content is 30% to 47.9% by weight, and the hardness value HV10gf is 800 to 960.

(c) Third layer: it is mainly an intermetallic compound phase such as FeAl or $FeAl_2$. The thickness of the third layer is about 0 to 10 μm, and is 4 to 7 μm in the illustrated example, wherein the Fe content is 48 to 69% by weight, and the hardness value HV10gf is 400 to 630.

(d) a discontinuously distributed surface layer, comprising a third layer structure, that is, an intermetallic compound phase such as FeAl, $FeAl_2$, and a second layer structure, that is, an intermetallic compound phase such as $Fe_2Al_5$, $FeAl_3$, etc., wherein the content of the third layer structure is at least 30% by volume, and the second layer structure is 70% or less, preferably without the second layer structure. The thickness of the surface layer is about 0 to 4 μm, and in the illustrated example, it is 0 to 3 μm, and the hardness value HV10gf is 650 to 850.

It should be noted that the coating structure of the formed component is also different according to the precoating thickness and the heating procedure of the precoated steel sheet, and the precoated steel sheet and the heating process according to the present invention ensure that the formed component has the coating structure required by the present invention. For example, when the thickness of the precoating is 5 μm, the thickness of the coating after stamping by the process of the present invention becomes 10 μm; as shown in the picture on the left side of FIG. 2, the coating structure includes only the layer a, that is, the interdiffusion layer, CT* in the figure indicates the thickness of the coating after hot stamping. When the precoating thickness is 14 μm, as shown in the middle picture of FIG. 2, the thickness of the coating after the stamping process of the present invention is changed to 21 μm, and the coating structure contains layers a, b, c and the discontinuous layer d.

In addition, it should be emphasized that as the coating is thinned, its microstructure gradually evolves, and the hardness of the surface layer of the coating gradually evolves as well. For example, a sheet having a precoating thickness of 14 μm is hot-stamped, and its coating structure is composed of layers a, b and c. The outermost layer is not mainly composed of brittle $Fe_2Al_5$ phase, but mainly FeAl or $FeAl_2$ phase, so the hardness of surface layer is correspondingly reduced greatly, and the hardness value HV10gf is 400-630, even if it contains a small amount of $Fe_2Al_5$ phase, the hardness value HV10gf does not exceed 630.

On the other hand, after the hot-stamping of the sheet having a precoating thickness of 5 μm, the final coating structure has only an interdiffusion layer with a thickness of about 10 μm, and the interdiffusion layer is mainly composed of α-Fe rich in Al and Si. In this instance, the hardness value HV10gf of the outermost layer is 220 to 410.

In contrast, in the case of a conventional steel having a precoating with a thickness of 25 μm, the final coating thickness after hot stamping is about 34 μm, and the outermost layer is a continuously distributed $Fe_2Al_5$ phase having a hardness of about 950 HV10gf.

As described above, after the precoated steel sheet of the present invention is hot stamped, the surface hardness gradually decreases as the thickness of the coating is reduced. In this way, not only the degree of wear of the stamping die is reduced, but also the life of the welding electrode is prolonged.

A bending test is performed on a bending test apparatus specified in the VDA238-100 standard. The sample is placed on two rollers, wherein it is ensured as far as possible that the installed rollers are free of friction. The preload threshold is set to 30 N. Preloading is carried out at a beam displacement speed of 10 mm/min After reaching the set value, it is pressed downward at a beam displacement speed of 20 mm/min The standard for finishing the test is that the pressure has a drop of 30 to 60 N after the pressure reached a maximum value.

Figure 5:
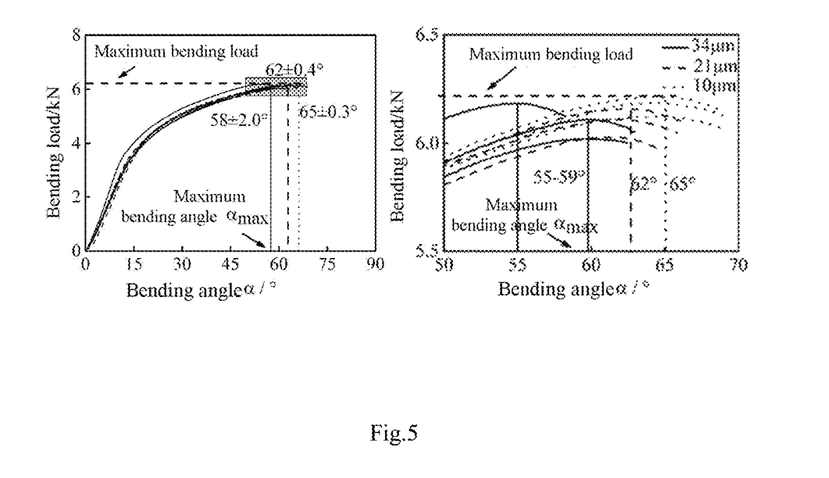
FIG. 5 is a three-point bending performance curve of a steel sheet having different precoating thicknesses after hot stamping of a 1.2 mm thick 22MnB5 steel, wherein the picture on the right side is a partial enlarged view of the picture on the left side.

The test result of the three-point bending test shows that the maximum bending angle $\alpha_{max}$ in the rolling direction is 65±0.3°, 62±0.4°, 58±2.0°, after the 1.2 mm thick 22MnB5 sheet having the precoating thickness of 5 μm, 14 μm and 25 μm respectively is hot stamped, as shown in FIG. 5.

That is to say, for a sheet having a thickness of 1.2 mm, the sheet of the present invention having a precoating of 5 μm has a VDA maximum bending angle of about 65 degrees after hot stamping, whereas the conventional sheet is having a precoating of 25 μm only has a VDA maximum bending angle of about 58 degrees after hot stamping, and its data scattering is large. It is apparent that the steel sheet having the precoating of 3 to 19 μm thick of the present invention can increase the maximum three-point bending angle by about 7 degrees as compared with the conventional precoated steel sheet. The reasons why the steel sheet of the present invention improves the VDA bending toughness are as follows.

Figure 6:
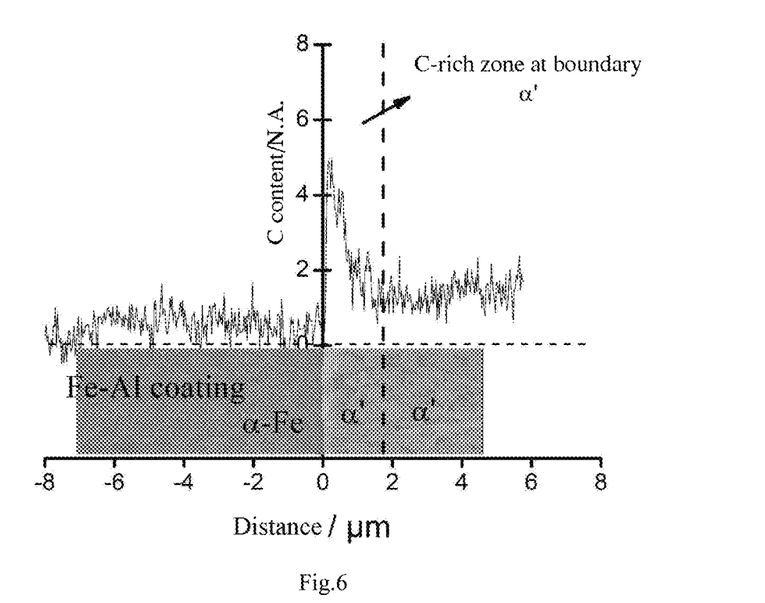
FIG. 6 is a view showing a C enrichment at the boundary between the coating and the substrate after hot stamping of 22MnB5 steel having Al—Si precoating.

The inventors analyses the coating and the distribution of elements in the substrate, and detects the C element distribution of the 22MnB5 coated sheet after hot stamping using the electron probe linear scanning function. As shown in FIG. 6, it is found that in the heating and austenization process, C atoms diffused into the substrate and formed a C-rich zone of 1 to 4 μm thick in the vicinity of the boundary between the interdiffusion layer and the substrate, and after quenching the C-rich zone remains in the vicinity of the interface between the substrate and the interdiffusion layer, forming a high C martensite, which is brittle, and the premature failure at this position during cold bending is an important cause of poor cold bending performance.

The inventors further found through research that the amount of C atom segregation can be reduced by reducing the thickness of the precoating, thereby improving the cold bending performance. Through calculation according to the experimental data of the embodiments, the interface of the alloying layer of the conventional steel sheet having 25 μm thick precoating moves towards the side of the base steel by 9 μm after hot stamping; in contrast, the interface of the alloying layer of the steel sheet having 14 μm and 5 μm thick precoating according to the present invention moves towards the side of the base steel by 7 μm and 5 μm respectively after hot stamping. Therefore, the total enrichment amount of C atoms in the base steel near the boundary between the coating and is the substrate after hot stamping, in the conventional steel sheet having the precoating of 25 μm is 1.8 and 1.4 times that in the steel sheet having the precoating of 14 μm and 5 μm according to the present invention.

Further, the mechanical properties are tested for the formed component through hot stamping of the precoated steel sheet shown in Table 3. The test results are shown in the following Table 4. Wherein, the formed components ISP1, ISP2, and CSP1 sequentially correspond to the precoated steel sheets IS1, IS2, CS1; TS represents tensile strength, YS represents yield strength, TE represents total elongation, and αmax represents the maximum bending angle (the bending angle under the maximum bending force), TD represents the direction that is perpendicular to the rolling direction, and RD represents the direction that is parallel to the rolling direction.

TABLE 4

Mechanical Property Results (JIS5 Sample)

| Sample number | TS/MPa | YS/MPa | TE/% | Amax(TD/RD) degree |
|---|---|---|---|---|
| ISP1 | 1569 ± 12 | 1128 ± 15 | 7.2 ± 0.17 | 62 ± 0.8/ 65 ± 0.3 |
| ISP2 | 1151 ± 14 | 1116 ± 26 | 7.1 ± 0.21 | 60 ± 0.7/ 62 ± 0.4 |
| CSP1 | 1545 ± 19 | 1132 ± 27 | 6.8 ± 0.49 | 54 ± 1.1/ 58 ± 2.0 |

As can be seen from the above table, as compared with the conventional precoated steel sheet, the precoated steel sheet of the present invention can increase the maximum bending angle and improve the cold bending performance; at the same time, it can also achieve tensile strength, yield strength and elongation which are comparable to or even higher than those of the conventional precoated steel sheet.

The hot stamped component of the present invention can be used as a safety structural component, a reinforcing structural component, a wheel component, a high-strength automobile structural component or a chassis structural component of a motor vehicle, including but not limited to A-pillar, B-pillar, automobile bumper, roof frame, chassis frame, and car door anti-collision bar.

The preferred embodiments of the present invention have been described above, but it should be understood by those skilled in the art that any possible changes or substitutions may be made without departing from the spirit and scope of the present invention.

For example, in the above embodiments, the case where the precoated steel sheet has the precoating on both upper and lower surfaces is described, but the precoating may be formed on one surface.

Further, the data and various parameters described in the embodiments are merely exemplary and are not intended to limit the present invention.

The invention claimed is:

1. A hot stamped component, comprising a coating of aluminium or an aluminium alloy on at least one surface of a base steel, the coating produced by interdiffusion between the base steel and a precoating of aluminium or aluminium alloy,
    wherein the coating is composed only of a first layer located on a side close to the base steel and is an innermost side,
    wherein the first layer is an interdiffusion layer having a thickness of 6 to 14 μm and which is covered on an outer side with a FeAl layer having a thickness of 1 to 2 μm, and
    wherein a composition of the interdiffusion layer is α-Fe containing Al and Si, wherein the Fe content is 70% by weight or more.

2. A hot stamping process for manufacturing the hot stamped component according to claim 1, comprising the following steps:
    a steel sheet austenization step including multi-stage heating a precoated steel sheet for hot stamping or a preformed component thereof to 840° C. or more, wherein the precoated steel sheet for hot stamping is provided with a precoating of aluminium or aluminium alloy on at least one surface of the base steel, the total thickness of the precoated steel sheet for hot stamping is 0.5 mm to 3.0 mm, and the thickness of the precoating is 3 to 19 μm;
    a steel sheet transfer step including transferring the heated precoated steel sheet to a hot stamping die, wherein it is ensured that the temperature of the precoated steel sheet is more than 550° C. when transferred to the die; and
    a hot stamping step including stamping the transferred precoated steel sheet in the die to obtain a hot stamped component,
    wherein, in the steel sheet austenization step, the multi-stage heating is performed in the following manner:
    for a precoated steel sheet having a thickness of 0.5 to 1.5 mm, the heating temperature is set to 700-875° C. in a preheating stage for coating alloying , the heating temperature in the first stage of austenization heating is set to 920-940° C., the heating temperature in the second stage is set to 940-960° C., the heating temperature in the third stage is set to 920-940° C., the fourth stage is a heat preservation stage, and the temperature is set to 900 to 920° C.;
    for the precoated steel sheet with a thickness of 0.5 to 1.0 mm, the total heating time for the first to the fourth stage of austenization heating is set to 90s to 140s;
    for the precoated steel sheet with a thickness greater than 1.0 mm and less than or equal to 1.5 mm, the total heating time for the first to the fourth stage of austenization heating is set to 120s to 180s; and
    for the precoated steel sheet having a thickness greater than 1.5 mm and less than or equal to 3.0 mm, the heating temperature in the preheating stage for coating alloying is set to 700 to 895° C.; in the austenization heating process, the heating temperature in the first stage is set to 940-960° C., the heating temperature in the second stage is set to 950-970° C., the heating temperature in the third stage is set to 940-960° C., the fourth stage is a heat preservation stage, and the temperature is set to 920 to 940° C., and wherein:

for the precoated steel sheet with a thickness greater than 1.5 mm and less than or equal to 2.0 mm, the total heating time for the first to the fourth stage of austenization heating is set to 180s-220s;

for the precoated steel sheet having a thickness greater than 2.0 mm and less than or equal to 2.5 mm, the total heating time for the first to the fourth stage of austenization heating is set to 180s-260s; and for the precoated steel sheet having a thickness greater than 2.5 mm and less than or equal to 3.0 mm, the total heating time for the first to the fourth stage of austenization heating is set to 200s-300s.

3. The hot stamping process according to claim 2, characterized by further comprising a paint baking step after the steel sheet transfer step, wherein in the paint baking step, the hot stamped component is heated to 130 to 200° C. and is held for 5 to 60 minutes and then is cooled in any way.

4. The hot stamped component according to claim 1, wherein the hot stamped component is formed by a precoated steel sheet for hot stamping, which is provided with a precoating of aluminium or aluminium alloy on at least one surface of the base steel, and wherein the total thickness of the precoated steel sheet for hot stamping is 0.5 mm to 3.0 mm, and the thickness of the precoating is 3 to 19 µm.

5. The hot stamped component according to claim 4, wherein the base steel comprises, by weight percentage, the following components: 0.28-0.4% of C; 0.6-3.5% of Mn; 0-0.004% of B; 0-0.4% of Nb+Ti +V, 0.05 to 1% of Si, 0.01 to 1% Al; total content of less than 5% of Cr, Mo, Ni, Cu; and unavoidable impurity elements.

6. The hot stamped component according to claim 4, wherein the base steel comprises, by weight percentage, the following components: 0.19 to 0.29% of C; 0.6 to 3.5% of Mn; 0 to 0.004% of B; 0 to 0.4% of Nb+Ti+V; 0 to 2% of Si, 0 to 2% of Al; total content of less than 5% of Cr, Mo, Ni, Cu; and unavoidable impurity elements.

* * * * *